United States Patent
Palmer et al.

(10) Patent No.: US 7,441,914 B2
(45) Date of Patent: Oct. 28, 2008

(54) PHOSPHORESCENT CHARGING SYSTEM FOR WHEELED VEHICLES HAVING PHOSPHORESCENT WHEELS

(75) Inventors: Jesse N. Palmer, Greenville, NC (US); Barry L. Allen, Greenville, NC (US)

(73) Assignee: Lunasee, LLC, Greenville, NC (US)

( * ) Notice: Subject to any disclaimer, the term of this patent is extended or adjusted under 35 U.S.C. 154(b) by 0 days.

(21) Appl. No.: 11/346,956

(22) Filed: Feb. 3, 2006

(65) Prior Publication Data

US 2006/0158868 A1   Jul. 20, 2006

Related U.S. Application Data

(63) Continuation-in-part of application No. 10/812,372, filed on Mar. 29, 2004, now Pat. No. 7,001,051.

(60) Provisional application No. 60/719,021, filed on Sep. 21, 2005, provisional application No. 60/459,395, filed on Apr. 1, 2003.

(51) Int. Cl.
*F21S 8/10* (2006.01)

(52) U.S. Cl. .................. 362/84; 362/500; 362/542; 362/473

(58) Field of Classification Search ............. 362/473, 362/500, 84, 42, 506, 542; D12/500; 313/502, 313/505, 511; 152/523–525; 250/461.1; 40/543; 188/19, 24.11–24.13, 24.22, 250 B
See application file for complete search history.

(56) References Cited

U.S. PATENT DOCUMENTS

| | | | |
|---|---|---|---|
| 3,253,634 A * | 5/1966 | DeYoung | 152/523 |
| 3,452,799 A * | 7/1969 | Hindin et al. | 152/523 |
| 3,729,041 A | 4/1973 | Kubota | |
| 3,906,443 A | 9/1975 | Musselman | |
| 3,946,782 A | 3/1976 | Petrasek et al. | |
| 3,984,726 A | 10/1976 | Ramler | |
| 3,997,184 A | 12/1976 | Riti | |
| 4,088,882 A | 5/1978 | Lewis | |
| 4,418,962 A | 12/1983 | Schaffer | |
| 4,847,735 A | 7/1989 | Kawasaki | |
| 4,881,153 A * | 11/1989 | Scott | 362/500 |
| 4,928,212 A * | 5/1990 | Benavides | 362/459 |
| 5,053,930 A | 10/1991 | Benavides | |
| 5,058,648 A | 10/1991 | Kansupada | |
| 5,105,308 A | 4/1992 | Holley et al. | |
| 5,278,732 A | 1/1994 | Frankum | |
| 5,330,195 A | 7/1994 | Gulick | |
| 5,374,377 A | 12/1994 | Nguyen et al. | |
| 5,477,427 A | 12/1995 | Forman | |
| 5,484,164 A * | 1/1996 | McInerney et al. | 280/11.203 |
| 5,523,925 A * | 6/1996 | Bare, IV | 362/473 |
| 5,558,426 A * | 9/1996 | Cabanatan et al. | 362/500 |
| 5,573,686 A | 11/1996 | Lavicska | |

(Continued)

FOREIGN PATENT DOCUMENTS

GB    2265586 A  *  10/1993

*Primary Examiner*—Sharon E Payne
(74) *Attorney, Agent, or Firm*—Coats & Bennett PLLC

(57) ABSTRACT

Various phosphorescence charging systems are provided for charging a phosphorescent wheel. The wheel is attached to the frame of a vehicle with nighttime or low light operation capability. The phosphorescence charging system directs electromagnetic radiation, such as ultraviolet light, onto phosphorescent portions of the wheel so as to cause subsequent phosphorescent emission therefrom.

6 Claims, 15 Drawing Sheets

U.S. PATENT DOCUMENTS

| | | | |
|---|---|---|---|
| 5,588,736 A | 12/1996 | Shea, Sr. | |
| 5,624,175 A | 4/1997 | Gelormino et al. | |
| 5,645,663 A | 7/1997 | Nakayama et al. | |
| 5,653,523 A | 8/1997 | Roberts | |
| 5,665,793 A | 9/1997 | Anders | |
| 5,714,255 A | 2/1998 | Yeh | |
| 5,759,671 A | 6/1998 | Tanaka et al. | |
| 5,823,653 A | 10/1998 | Elam, Jr. et al. | |
| 5,869,930 A * | 2/1999 | Baumberg et al. | 313/506 |
| 5,871,269 A | 2/1999 | Chien | |
| 5,876,108 A | 3/1999 | Chien | |
| 5,914,197 A | 6/1999 | Goudjil | |
| 5,925,287 A | 7/1999 | Mathiasson et al. | |
| 5,964,312 A | 10/1999 | Maldonado | |
| 5,976,411 A | 11/1999 | Feng et al. | |
| 5,984,487 A | 11/1999 | McGhee | |
| 6,005,024 A | 12/1999 | Anders et al. | |
| 6,059,377 A | 5/2000 | Wu | |
| 6,070,997 A | 6/2000 | Duke et al. | |
| 6,186,635 B1 | 2/2001 | Peterson et al. | |
| 6,207,077 B1 | 3/2001 | Burnell-Jones | |
| 6,286,573 B1 | 9/2001 | Hine | |
| 6,305,818 B1 | 10/2001 | Lebens et al. | |
| 6,322,237 B1 | 11/2001 | Lee | |
| 6,375,864 B1 | 4/2002 | Phillips et al. | |
| 6,431,236 B1 | 8/2002 | Kanenari et al. | |
| D486,124 S * | 2/2004 | LeFranc | D12/605 |
| 6,731,202 B1 | 5/2004 | Klaus | |
| 6,742,913 B2 | 6/2004 | Deutsch | |
| 6,779,913 B2 * | 8/2004 | Niezrecki et al. | 362/473 |
| 6,807,995 B1 * | 10/2004 | Majumdar et al. | 152/523 |
| 6,832,847 B2 * | 12/2004 | Frosythe et al. | 362/473 |
| 2001/0050124 A1 | 12/2001 | Smith | |
| 2003/0140999 A1 | 7/2003 | Smith et al. | |

* cited by examiner

PHOSPHORESCENT CHARGING SYSTEM FOR WHEELED VEHICLES HAVING PHOSPHORESCENT WHEELS

This application is a continuation-in-part of U.S. application Ser. No. 10/812,372, filed 29 Mar. 2004 now U.S. Pat. No. 7,001,051, which claims benefit of U.S. Provisional Application Ser. No. 60/459,395, filed on 1 Apr. 2003, both of which are incorporated herein by reference in their entirety; this application also claims the benefit of U.S. Provisional Application No. 60/719,021, filed 21 Sep. 2005, the entirety of which is incorporated herein by reference.

BACKGROUND OF THE INVENTION

This invention relates to wheeled vehicle safety during nighttime or low-lighting conditions, and in particular to an ultraviolet light emitting structure for exciting a phosphorescent component of a wheel structure in order for the wheel to emit visible light.

Wheeled vehicles are often under-equipped with side lighting structures. Side lighting can be very important to the safety of vehicle operators at nighttime, particularly in the case of bicycles, bicycle trailers, mopeds, motorcycles, scooters, jogging strollers, baby strollers, wheelchairs, and other vehicles which typically do not offer the powerful lighting systems available to automobiles.

Various fixed point lighting systems are available to address this problem, but with a series of drawbacks. Many systems offer a very small light producing area that is anywhere from several millimeters to only a couple of inches in area, and are therefore simply inadequate in drawing the attention of motorists. In the case of safety structures mounted onto a rotating wheel, such as tireflys and reflectors, an optical illusion called "cycloid movement" is created by the motion of the product as it turns, and the vehicle may appear to have a velocity and course that is deceptive with respect to its actual movement. As such, there remains a need for alternative safety lighting approaches, advantageously alternative approaches that optionally address one or more of the drawbacks of the prior art.

SUMMARY OF THE INVENTION

The invention provides an artificial source of phosphorescence charging in place of the sunlight usually required to make a phosphorescent wheel glow. The artificial source is located proximate the phosphorescent surface(s) of the wheel, and directs its electromagnetic radiation onto the phosphorescent surface(s) so as to charge surface(s) for subsequent phosphorescent glow.

In one embodiment, a wheeled vehicle comprises: a frame; at least one rotatable wheel mounted to the frame; the wheel having first and second phosphorescent sides; and a phosphorescence charging system coupled to the frame and adapted to charge the first and second phosphorescent sides by radiating the phosphorescent sides with electromagnetic radiation. The phosphorescence charging system may comprise first and second emitters adapted to charge the first and second phosphorescent sides, respectively, by emitting electromagnetic radiation that is directed to be incident on the phosphorescent sides; and means to power the phosphorescence charging system. The phosphorescence charging system may further comprise a switch disposed electrically between the means to power and the emitters. The wheel may comprise a tire, a rim, and a hub, advantageously with phosphorescent material molded in the tire. The emitters may be light emitting diodes, or may be fluorescent tubes, or may take other forms. The power for the emitters may come from any known power source, such as a battery and/or a dynamo. The wheeled vehicle may, in some embodiments, be a bicycle, a stroller, or a motorcycle. The vehicle may further include a plurality of exterior light emitting structures directed away from the wheel, which may optionally be powered by a common power source with the phosphorescence charging system. In this embodiment, the phosphorescence charging system charges both sides (left, right) of a single phosphorescent wheel. The phosphorescence charging system may also charge the rolling surface of the wheel, if desired.

In another embodiment, a wheeled vehicle comprises: a frame; first and second rotatable wheels mounted to the frame; the wheels having at least one phosphorescent side each facing in the same general direction; a phosphorescence charging system coupled to the frame and comprising first and second emitters; wherein the first emitter is disposed so as to charge the phosphorescent side of the first wheel by radiating the phosphorescent side of the first wheel with electromagnetic radiation; and wherein the second emitter is disposed so as to charge the phosphorescent side of the second wheel by radiating the phosphorescent side of the second wheel with electromagnetic radiation. The phosphorescence charging system may further comprise means to power the phosphorescence charging system and a switch disposed electrically between the means to power and the emitters. The first and second emitters may take the form of light emitting diodes, advantageously light emitting diodes with a peak wavelength within the range of 100-410 nanometers. The phosphorescent sides of the first and second wheels form a visual loop when the wheels are rotated and the phosphorescent sides are charged by the phosphorescence charging system.

In another embodiment, a wheeled vehicle comprises: a frame; at least one rotatable wheel mounted to the frame; the wheel having at least a first phosphorescent side; a brake assembly operatively coupled to the frame and comprising: at least one brake pad moveable relative to wheel and operative to engage the wheel to retard rotation thereof; an emitter disposed to direct electromagnetic radiation emitted therefrom at the first phosphorescent side of the wheel so as to charge the first phosphorescent side for subsequent phosphorescence; and means to power the emitter. The brake assembly may further comprise a brake booster element, with the emitter disposed in the brake booster element. Alternatively, the brake assembly may further comprise a brake pad post disposed outboard of the brake pad relative to the wheel, with the emitter supported by the brake pad post. The emitter may move with the brake pad, such as being disposed in the brake pad.

In another embodiment, a wheeled vehicle comprises: a frame; at least one rotatable wheel mounted to the frame; the wheel having at least a first phosphorescent side; a fender assembly coupled to the frame proximate the wheel, the fender comprising an emitter disposed to direct electromagnetic radiation emitted thereby to be incident on the first phosphorescent side of the wheel so as to charge the first phosphorescent side for subsequent phosphorescence; and means to power the emitter. The emitter may comprise a light emitting diode, advantageously with a peak wavelength within the range of 100-410 nanometers. The means to power the emitter, such as one or more batteries, may be supported by the fender assembly A photosensor may be included and operative to control a connection between the emitter and the means to power the emitter.

DETAILED DESCRIPTION OF THE INVENTION

One solution that overcomes the twin drawbacks of inadequately sized lighting and cycloid movement in side lighting is the use of wheels that produce their own light. Wheels with this ability would have large enough light-producing area to more effectively draw attention over larger distances, as well as in situations involving a higher level of potential road distractions, such as busy areas saturated with many sources of light.

One approach to creating light producing wheels is that of phosphorescent (glow in the dark) wheels, particularly tires. Such tires may contain, or be coated with, an amount of phosphorescent pigment on the outer surface. Typically, the pigment that causes these tires to glow needs exposure to ultraviolet rays in order to charge before becoming active and producing light. At the same time, these pigments do not hold a strong charge for more than several seconds to a few minutes from the time of charging exposure. Thus, if sunlight is used as the charging source, the energy stored within the phosphorescent pigment will be mostly discharged by the time it becomes adequately dark outside and the product is in an environment where it is most needed. The resulting safety lighting effect is therefore greatly diminished. As such, the present invention contemplates using an artificial phosphorescence charging source, such as an ultraviolet light emitting diode (LED), that directs its emitted electromagnetic energy (e.g., ultraviolet, and near-ultraviolet light) onto phosphorescent wheel(s) to charge them for subsequent phosphorescent discharge. For simplicity, the following description is generally in the context of a bicycle; however, various embodiments may also be used on other non-automotive wheeled vehicles, such as jogging strollers, baby strollers, wheelchairs, scooters, mopeds, motorcycles, bicycle trailers, and the like.

Figure 1:
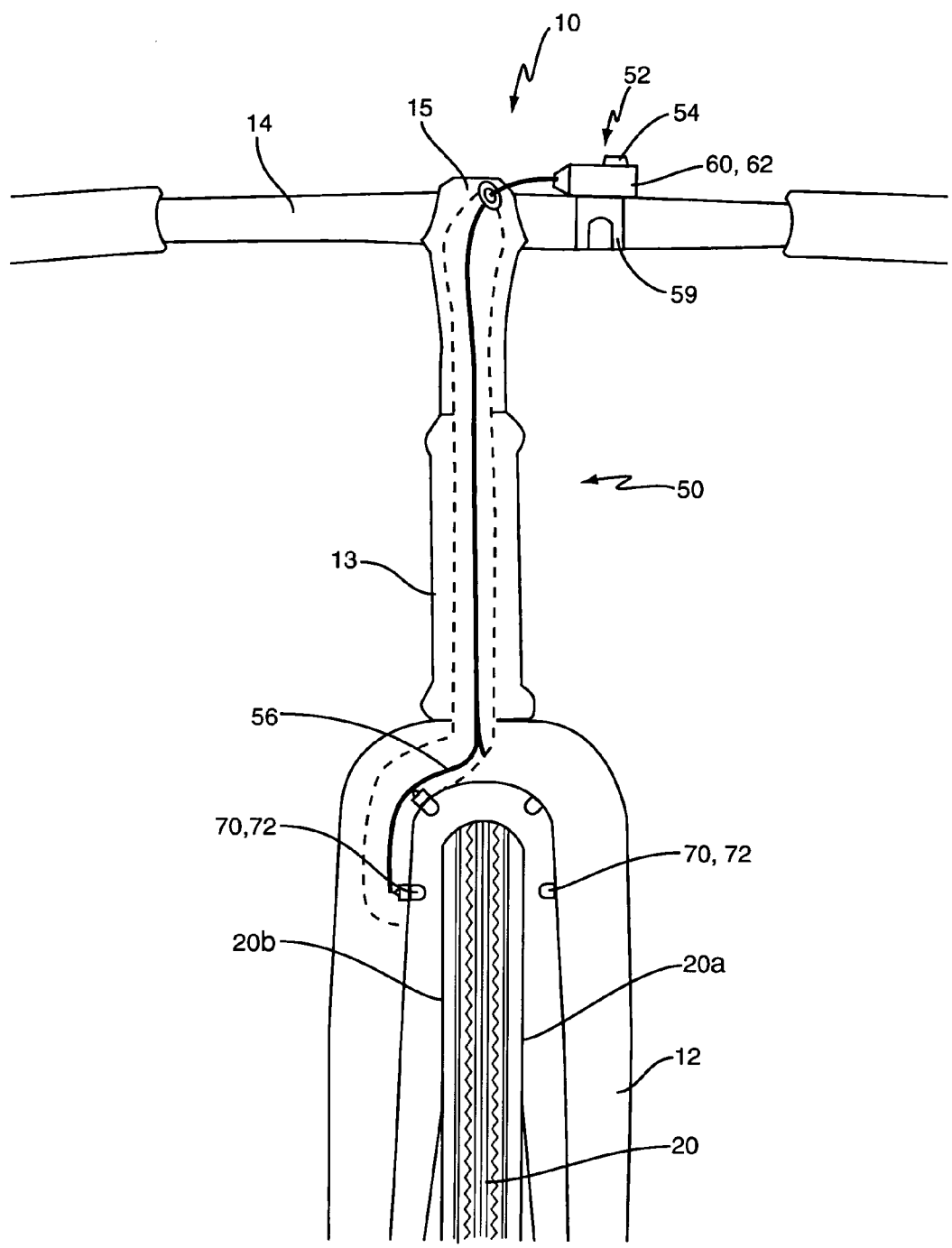
FIG. 1 is a frontal view of a bicycle fork comprising an ultraviolet light emitting structure.

FIG. 1 shows one embodiment of the invention. In FIG. 1, a bicycle 10 is equipped with an phosphorescence charging system 50 that selectively shines ultraviolet light onto both sides 20a,20b of phosphorescent wheel 20. In general, the bicycle 10 includes a frame that includes a main frame 11, forks 12, and a head tube 13, handlebars 14, optionally one or more fenders 16, and optional braking assemblies 30. The main frame 11 typically takes the form of joined tubular members, and typically provides a location for rotatably mounting the rear wheel 20. The forks 12 are rotatably mounted to the main frame 11 via the head tube 13, and the handlebars 14 are affixed to the top of the fork structure. The front wheel 20 is rotatably mounted to the forks 12. The fenders 30 are disposed above the wheels 20, and are mounted to the main frame 11 or forks 12 via suitable mounting bosses 17 or other means known in the art. The braking assemblies 30 typically include calipers 32 that move laterally inward and away from the wheels 20. The calipers 32 may be of a center-pull type or a side-pull type, as is desired. Brake pads 36 are mounted on the calipers 32 so as to move therewith, typically via suitable mounting posts 38.

The phosphorescence charging system 50 of FIG. 1 includes a power source 60, a control unit 52, ultraviolet emitters 70, and associated interconnecting wires 53. The power source 60 takes the form of a battery pack 62 which is housed in the control unit 52. The control unit 52 also includes a switch 54 that controls the on/off state of the ultraviolet emitters 70 and, in this embodiment, is attached to handlebars 14. The ultraviolet emitters 70, in this embodiment, take the form of a plurality of ultraviolet LEDs 72. The LEDs 72 are disposed on the inner surface of the forks 12 so that the LEDs 72 on the left side project their emitted light onto the left side 20a of wheel 20, and the LEDs 72 on the right side project their emitted light onto the right side 20b of wheel 20. Advantageously, the LEDs 72 are mounted internal to the forks 12, but protrude slightly outwardly therefrom. The LEDs 72 are supplied electrical power via wire 56, which is shown in FIG. 1 as running from the inner structure of the forks 12, up through the cycle frame's head tube 13, through the handlebar stem 15, through a suitable grommeted wire port, to control unit 52. The various wires 56, control unit 52, and the like may be mounted or otherwise secured using suitable straps 59, such as cable ties, screw-adjustable straps, adhesive and/or synthetic straps, rubber bands, and the like.

Activating switch 54 causes electric current to travel from battery pack 62 to LEDs 72 through wire 56. The LEDS 72 then emit ultraviolet light directed onto the respective side surfaces 20a,20b of wheel 20, thereby exciting phosphorescent surfaces 20a,20b on wheel 20. Thus, in the embodiment of FIG. 1, the phosphorescence charging system 50 directs ultraviolet light at both sides 20a,20b of phosphorescent wheel 20. The excited areas on the wheel 20 in turn emit visible light, which advantageously forms visual circles as the wheel 20 rotates, with one of the visual circles being visible from each side of the bicycle 10.

Figure 2:
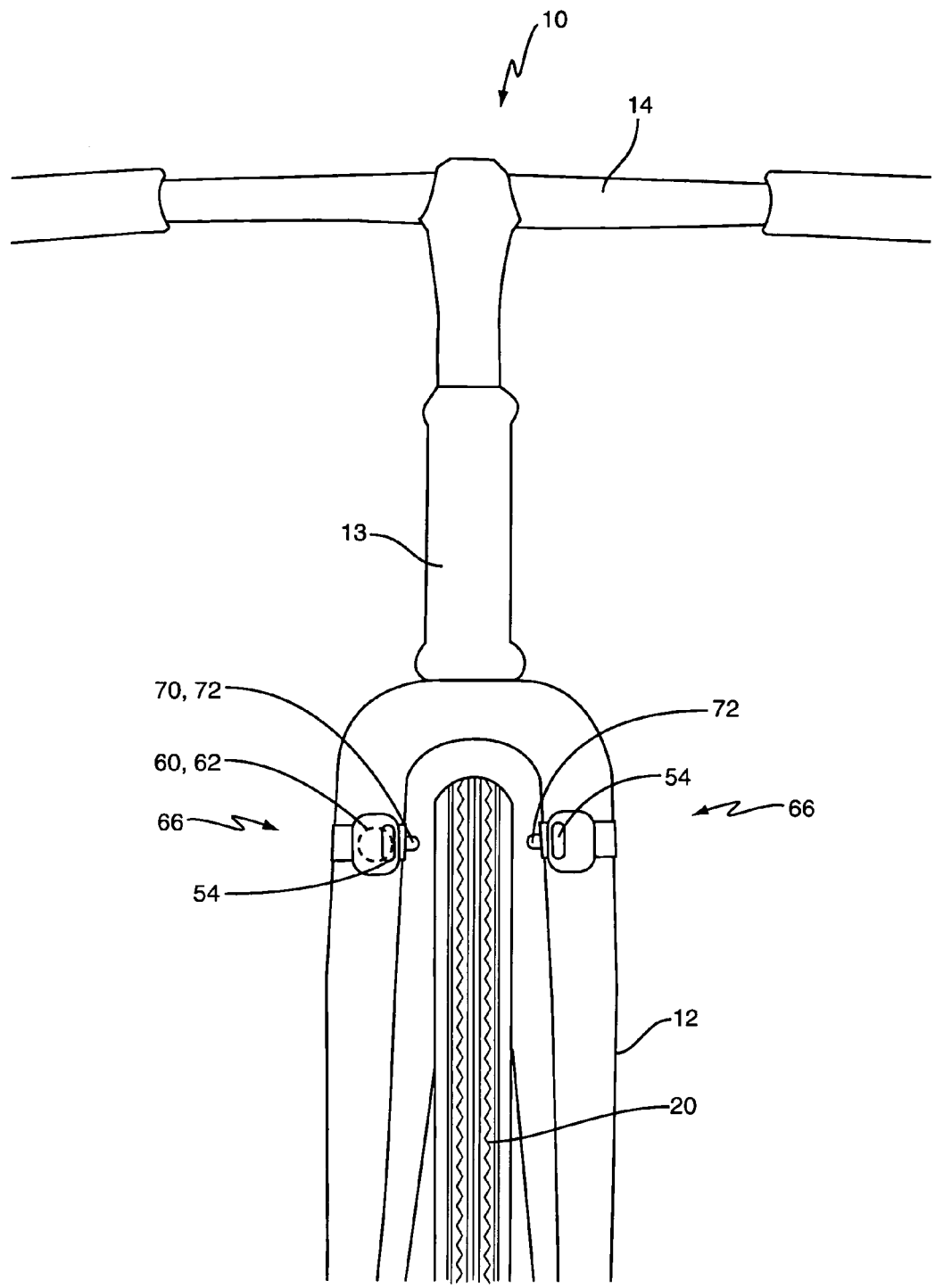
FIG. 2 is a frontal view of a bicycle fork comprising an ultraviolet light emitting structure comprising a strap.

In the embodiment of FIG. 2, the phosphorescence charging system 50 is integrated into two distinct housings 66, with each housing have an ultraviolet emitter 70 (such as LED 72), power source (such as battery 62), and a control 52 (such as switch 54). The housing 66 advantageously takes the form of a plastic or synthetic component housing attached to forks 12 with an adjustable strap 59. There is at least one ultraviolet emitter 79 for each side surface 20a,20b of phosphorescent wheel 20 that directs its emitted ultraviolet light onto that side surface of wheel 20. Thus, as can be seen in FIG. 2, one component housing 66 is disposed on each fork 12, so that ultraviolet light may be directed at both sides 20a,20b of phosphorescent wheel 20 in order to produce the phosphorescent glow visible from both sides of the bicycle 10.

Figure 3:
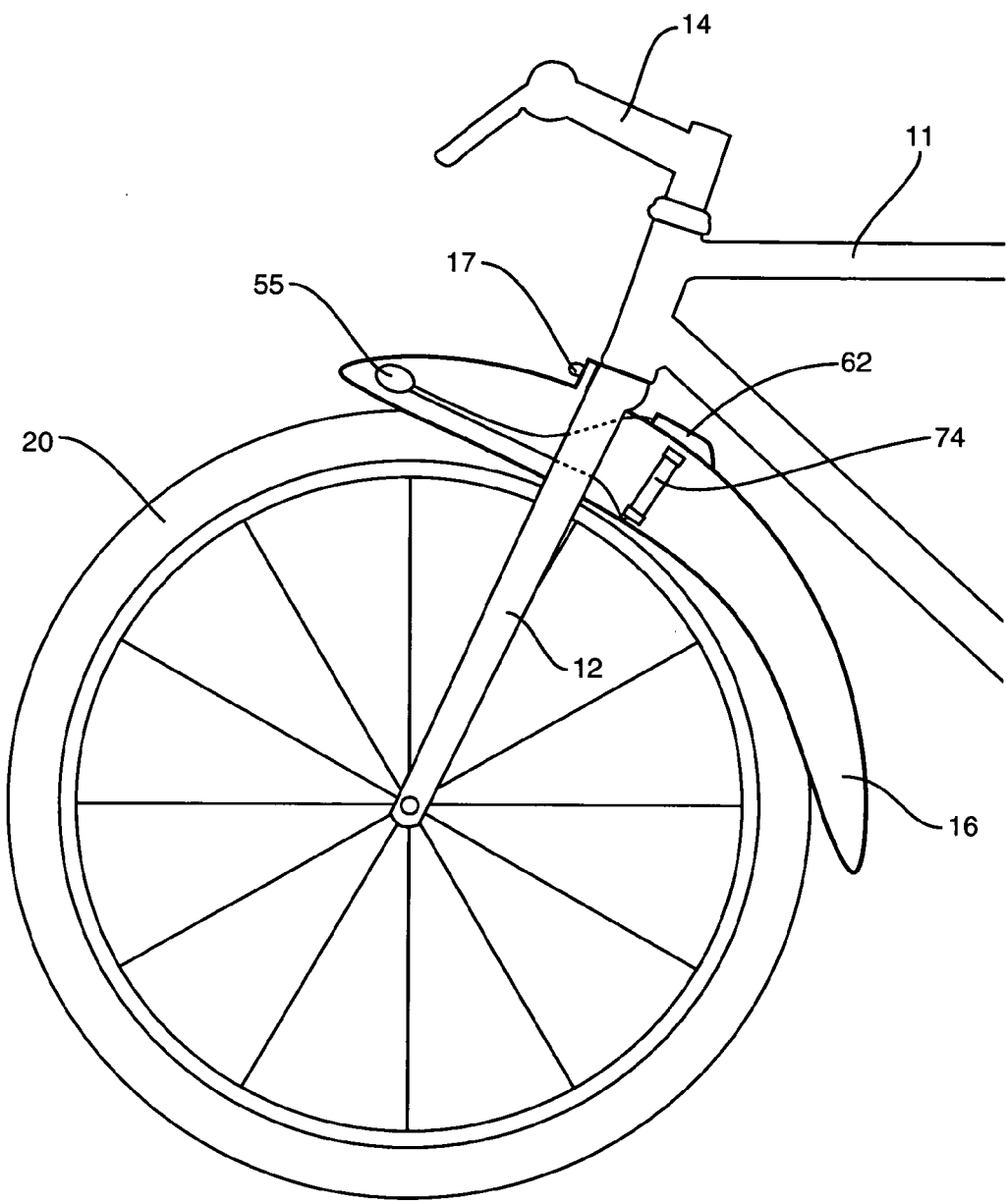
FIG. 3 is a side view of a bicycle fender comprising an ultraviolet light emitting structure.

In the embodiment of FIG. 3, the ultraviolet emitter 70 takes the form of a fluorescent tube 74, rather than an LED 72. In this embodiment, the fluorescent tubes 74 are used to generate the required phosphorescence charge energy, advantageously with at least one fluorescent tube 74 disposed on each side 20a,20b of wheel 20. For the embodiment of FIG. 3, the fluorescent tubes 74 are mounted on the underside of front fender 16. In addition, the control unit 52 portion of the phosphorescence charging system 50 of FIG. 3 includes a motion/photo sensor 55 attached to fender 16. This motion/photo sensor 55 conceptually acts as a switch to control the on/off state of the fluorescent tubes 74. Moving the bicycle 10, and thus fender 16, while in darkness or low light causes sensor 55 to activate and complete the power circuit to fluorescent tubes 74. By using motion/photo sensor 55 as opposed to a traditional manual switch, the fluorescent tubes 74 may be limited to activating only at night or in other low light conditions.

Figure 4:
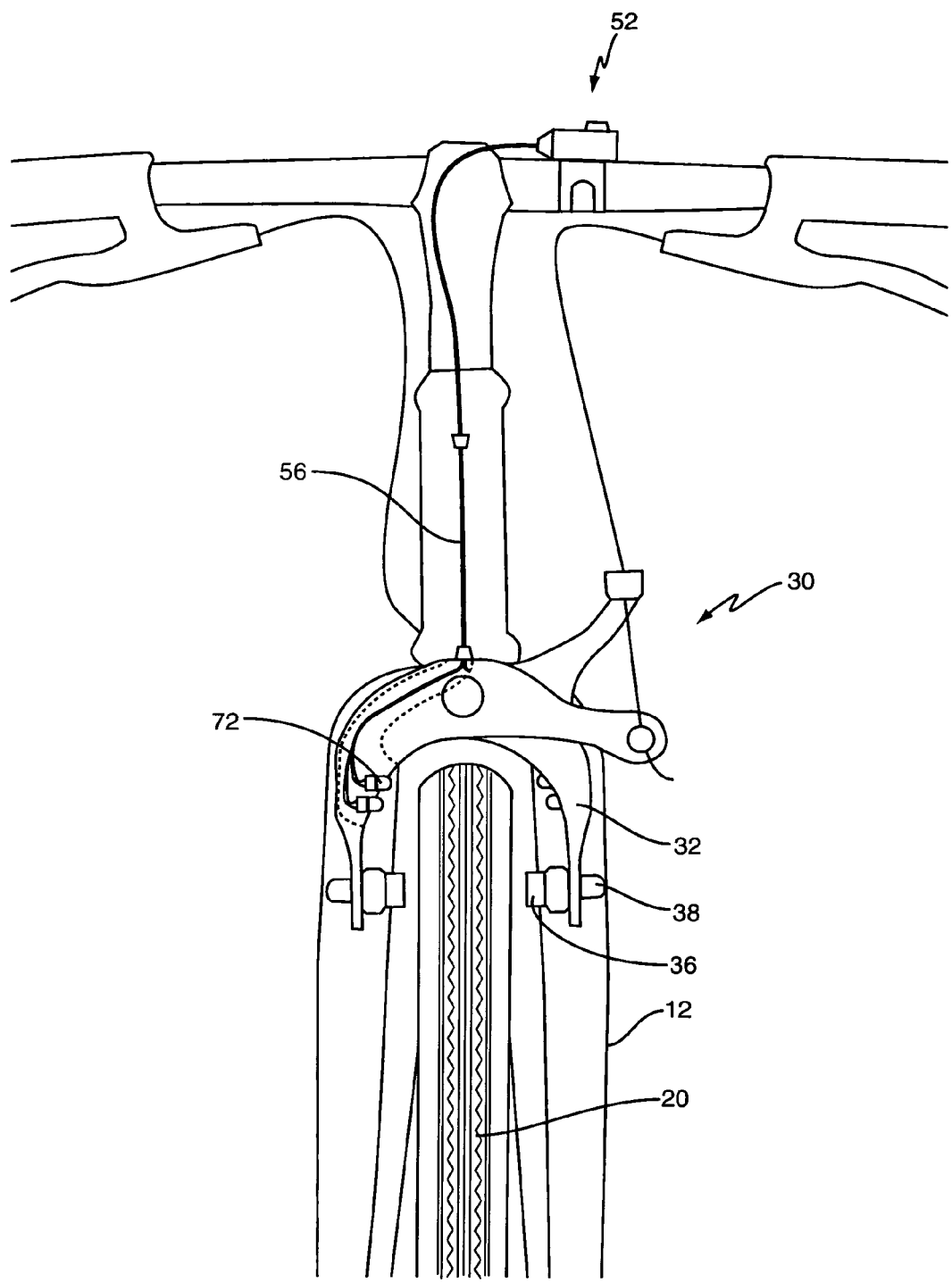
FIG. 4 is a frontal view of a bicycle brake caliper comprising an ultraviolet light emitting structure.

In the embodiment of FIG. 4, the emitter portion 70 of the phosphorescence charging system 50 are mounted on a portion of the brake assembly 30. In FIG. 4, a plurality of ultraviolet LEDs 72 are mounted within a set of brake calipers 32 and disposed so as to direct the ultraviolet light emitted thereby on the side surfaces 20a,20b of phosphorescent wheel 20. Therefore, the LEDs 72 move toward and away from the wheel 20 as the calipers 32 move. The requisite power wires 56 may be routed partially internal to the calipers 32, or external thereto, as is desired. As above, switch 54 selectively connects LEDs 72 to their power source 60, which in this embodiment takes the form of battery pack 62.

Figure 5:
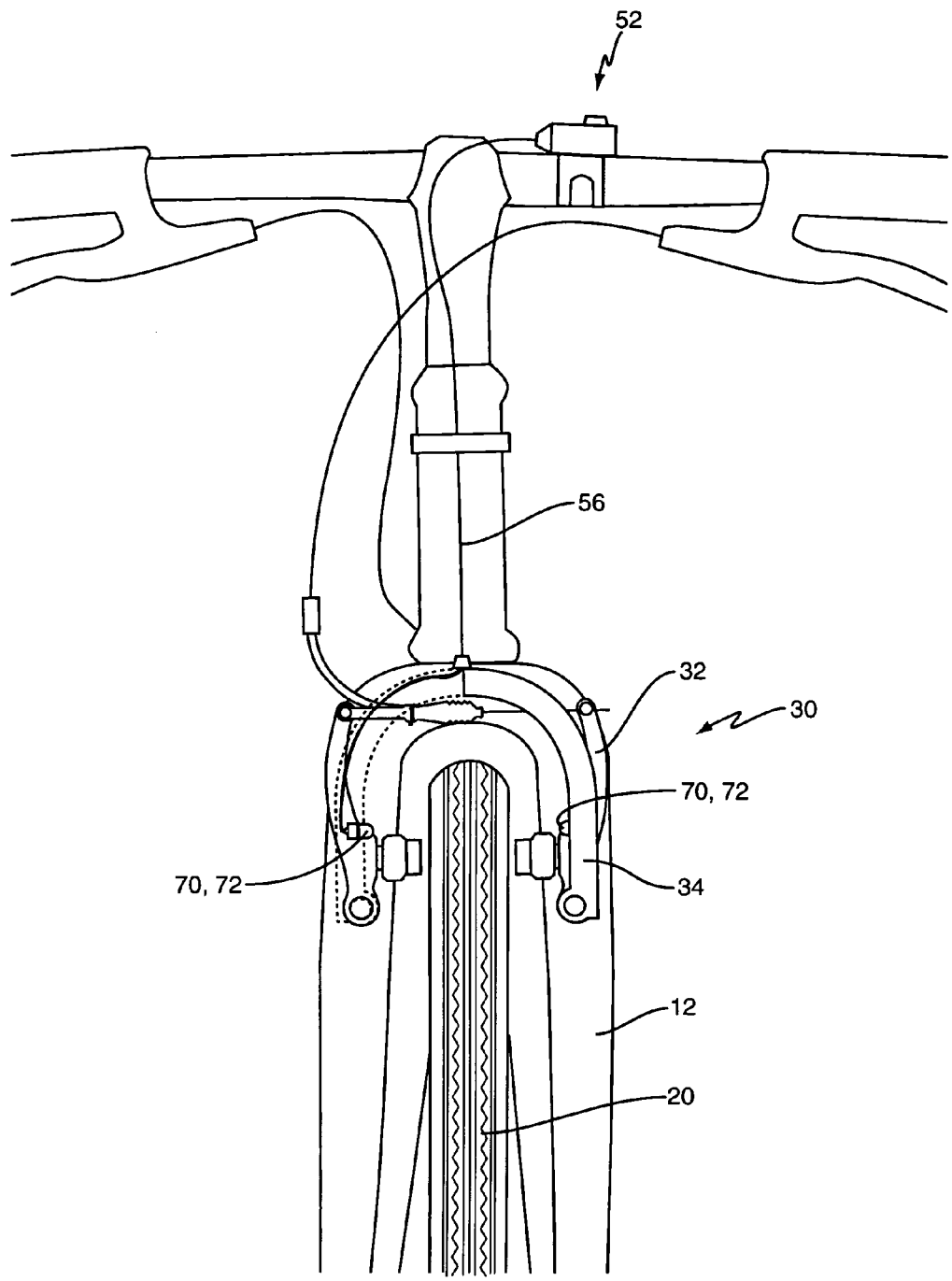
FIG. 5 is a frontal view of a bicycle brake booster comprising an ultraviolet light emitting structure.

In another embodiment, shown in FIG. 5, LEDs 72 are mounted to another portion of braking assembly 30; in this embodiment, the so-called brake booster 34. The brake booster 34 is a generally U-shaped component that helps stabilize the location of the pivot points for calipers 32. Typically, the brake booster 34 overlaps and connects to brake calipers 32 through a group of mounting ports. Power is supplied and controlled as described above.

Figure 6:
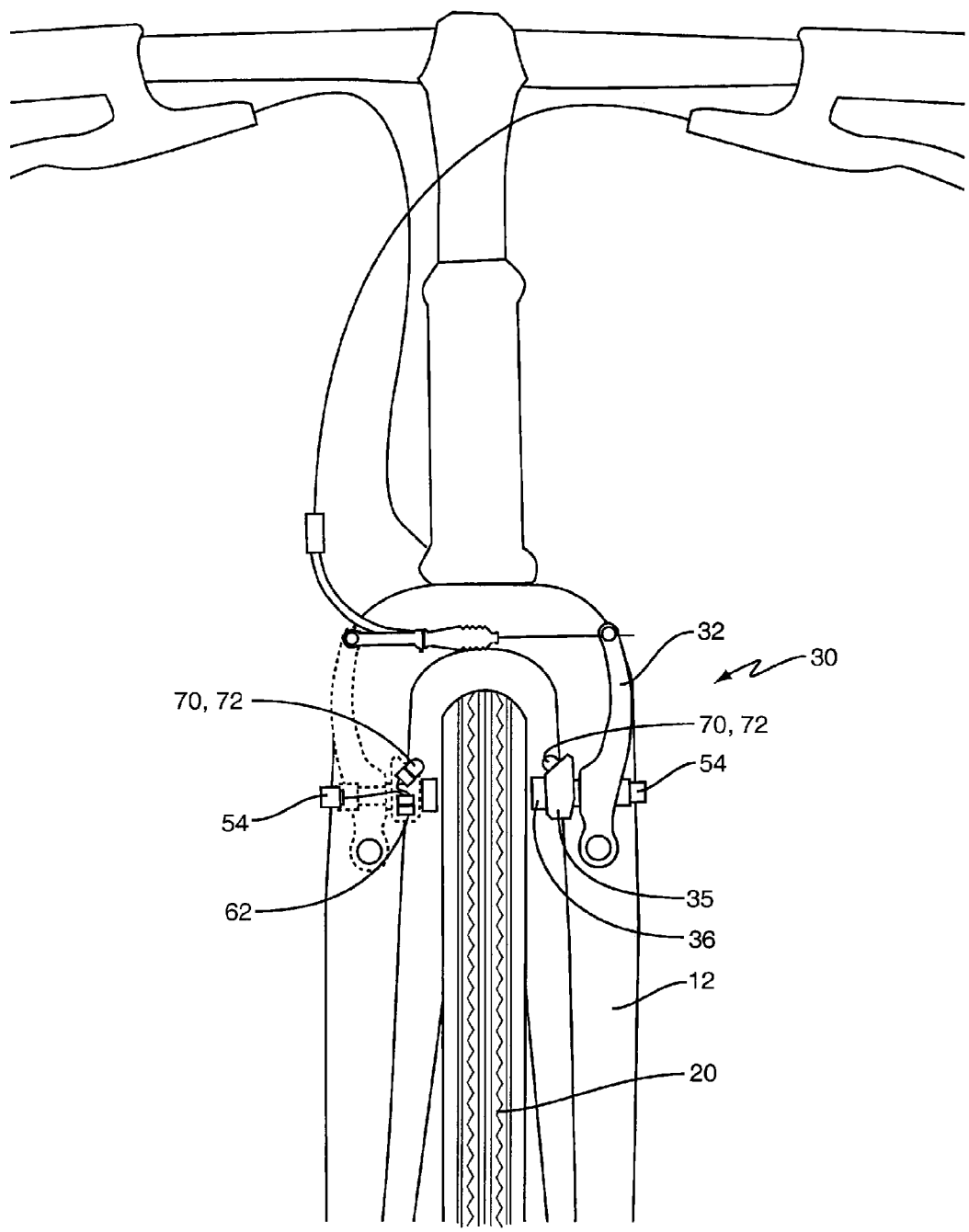
FIG. 6 is a frontal view of a bicycle brake pad housing comprising an ultraviolet light emitting structure.

In another embodiment, shown in FIG. 6, LEDs 72 are mounted to another portion of braking assembly 30; in this embodiment, the brake pad housings 35. The brake pad housings 35 mount to respective brake calipers 32 through brake pad mounting posts 38, as is conventional. Power may be supplied to LEDs 72 from corresponding batteries 62 which are mounted in brake pad housings 35, and controlled by respective switches 54 located on the ends of brake pad mounting posts 38.

Figure 7:
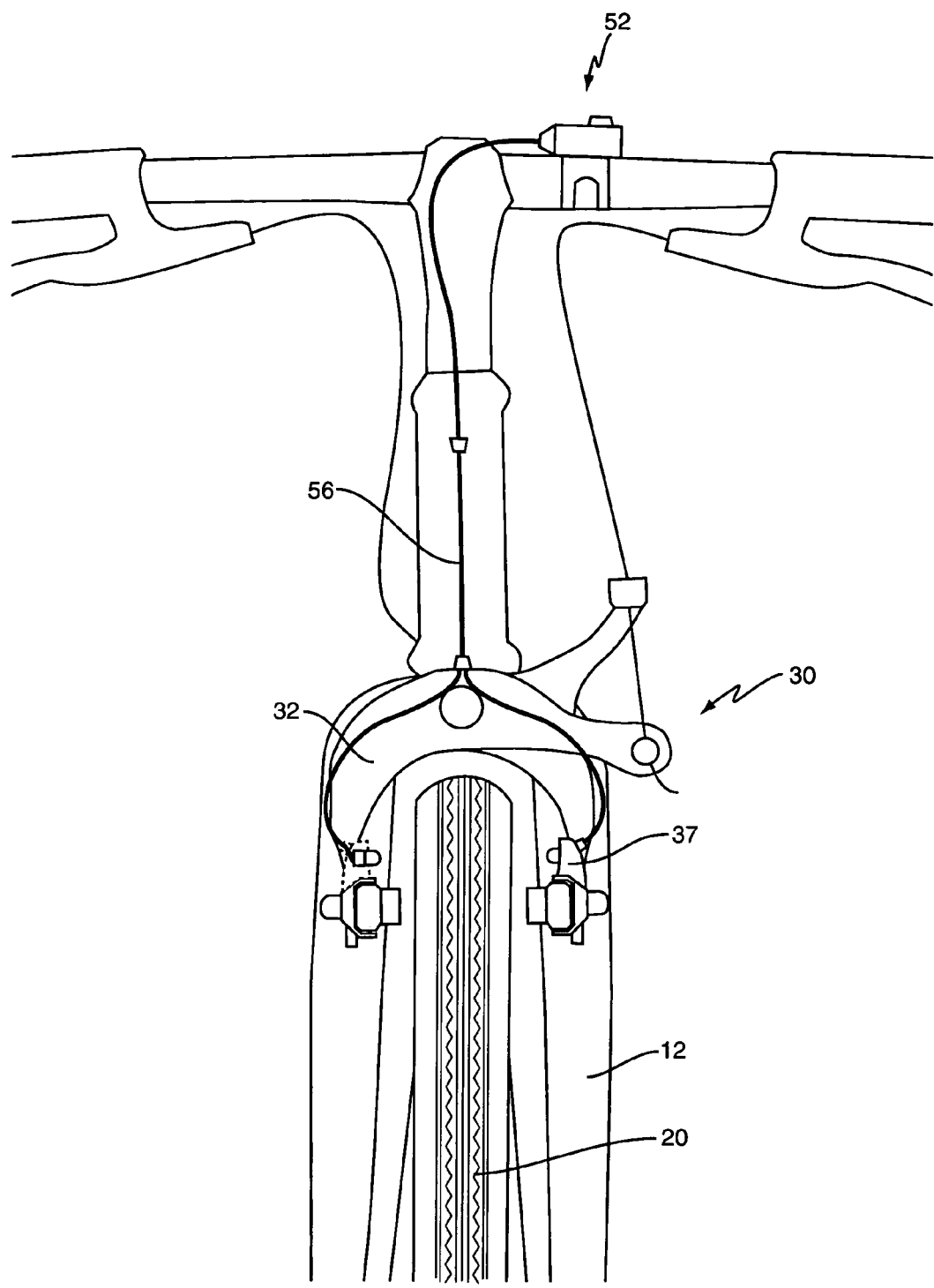
FIG. 7 is a frontal view of a bicycle brake post comprising an ultraviolet light emitting structure comprising a brake post housing port.

In another embodiment, shown in FIG. 7, LEDs 72 are mounted to another portion of braking assembly 30; in this embodiment, the brake pad post mounting clips 37. The brake pad post mounting clips 37 attach to the brake pad mounting posts 38. The brake pad mounting clips 37 are secured to move with the calipers 32 when the brake pad housings 35 are mounted in a conventional fashion using brake pad mounting posts 38. Power is supplied and controlled as described above.

Figure 8:
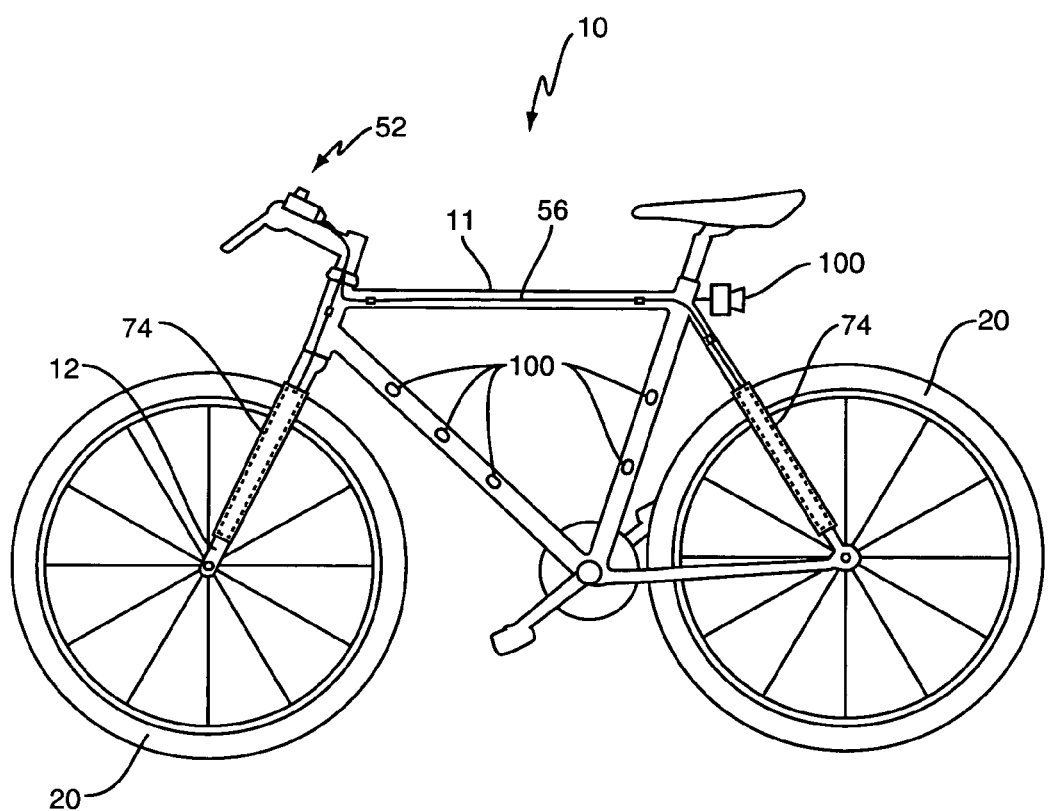
FIG. 8 illustrates a side view of a bicycle comprising an ultraviolet light emitting structure on both front and rear wheels using external wiring.

FIG. 8 shows a phosphorescence charging system 50 that directs ultraviolet light onto the same side of two different wheels 20. The phosphorescence charging system 50 of FIG. 8 includes a control unit 52 and at least two ultraviolet emitters 70. The ultraviolet emitters 70 take the form of respective ultraviolet light emitting fluorescent tubes 74 attached to forks 12 and attached to bike main frame 11. As generally described above, suitable wires 56, secured to and/or routed through the main frame 11 and/or forks 12, connect the fluorescent tubes 74 with control unit 52 for controlling the on/off state of the fluorescent tubes 74. As can be seen, fluorescent tube 74 associated with forks 12 projects ultraviolet light onto the left side 20a of front wheel 20 and while the other fluorescent tube 74 projects its ultraviolet light onto the left side 20a of rear wheel 20. Thus, in FIG. 8, phosphorescence charging system 50, comprising fluorescent tubes 74, wires 56, and switch 54, direct ultraviolet light at the same side (e.g., left side) of two different wheels 20 of the bicycle 10. The excited areas on the wheels 20 in turn emit visible light, which advantageously forms respective visual circles as the wheels 20 rotate. If desired, a similar approach may be taken for the other side (e.g., right side) of the main frame 11/forks 12.

Figure 9:
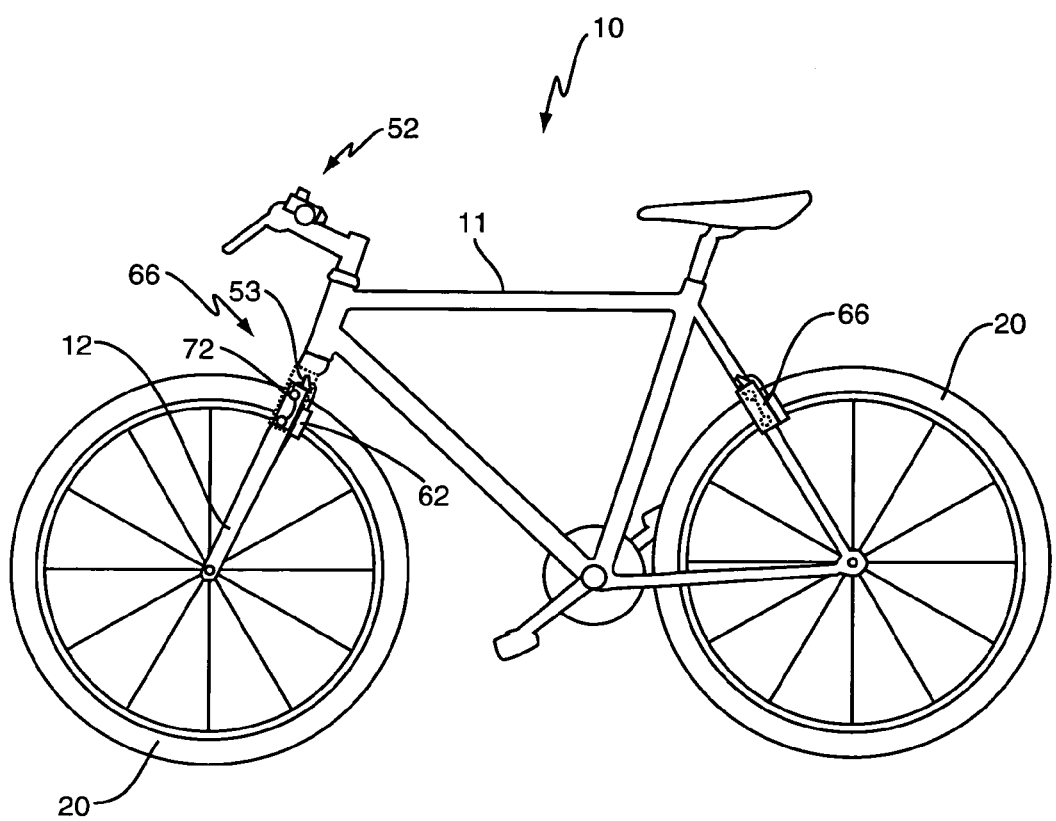
FIG. 9 is a side view of a bicycle comprising an ultraviolet light emitting structure comprising a wireless activation switch on both front and rear wheels.

FIG. 9 shows an arrangement where each wheel 20 has a corresponding unit 66 that houses two ultraviolet LEDs 72 for shining ultraviolet light on the wheel 20. One unit 66 is attached to main frame 11, and the other unit is attached to forks 12. The two units 66 are in turn controlled by control unit 52 attached to handlebars 14. The units 66 each include a plastic housing for attaching to the forks 12 or main frame 11, a battery 62, and a receiver switch 53. In addition, control unit 52 includes a transmitter (not shown), a battery, and a switch 54. Activating switch 54 causes a signal to be wirelessly transmitted from control unit 52 to the units 66, which is received by receiver switches 53, and which causes the batteries 62 to be electrically connected to the corresponding LEDs 72. Thus, the embodiment of FIG. 9 is conceptually a wireless version of the embodiment of FIG. 8 with LEDs 72 rather than fluorescent tubes 74.

Figure 10:
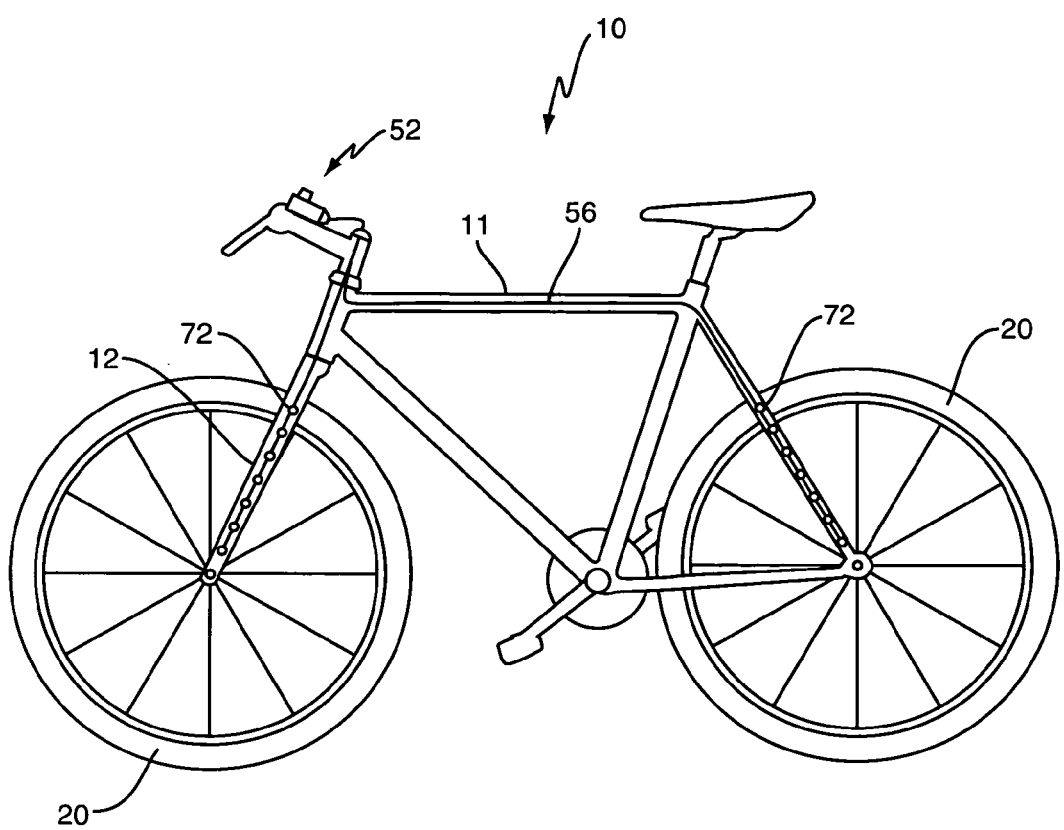
FIG. 10 is a side view of a bicycle comprising an ultraviolet light emitting structure on both front and rear wheels with internal wiring.

FIG. 10 shows a plurality of ultraviolet LEDs 72 mounted in forks 12 on one side of front wheel 20 and a plurality of ultraviolet LEDs 72 mounted in bike main frame 11 near rear wheel 20. Power is supplied and controlled as described above. Thus, the embodiment of FIG. 10 is conceptually similar to the embodiment of FIG. 8, with two sets of LEDs 72, rather than fluorescent tubes 74.

Figure 11:
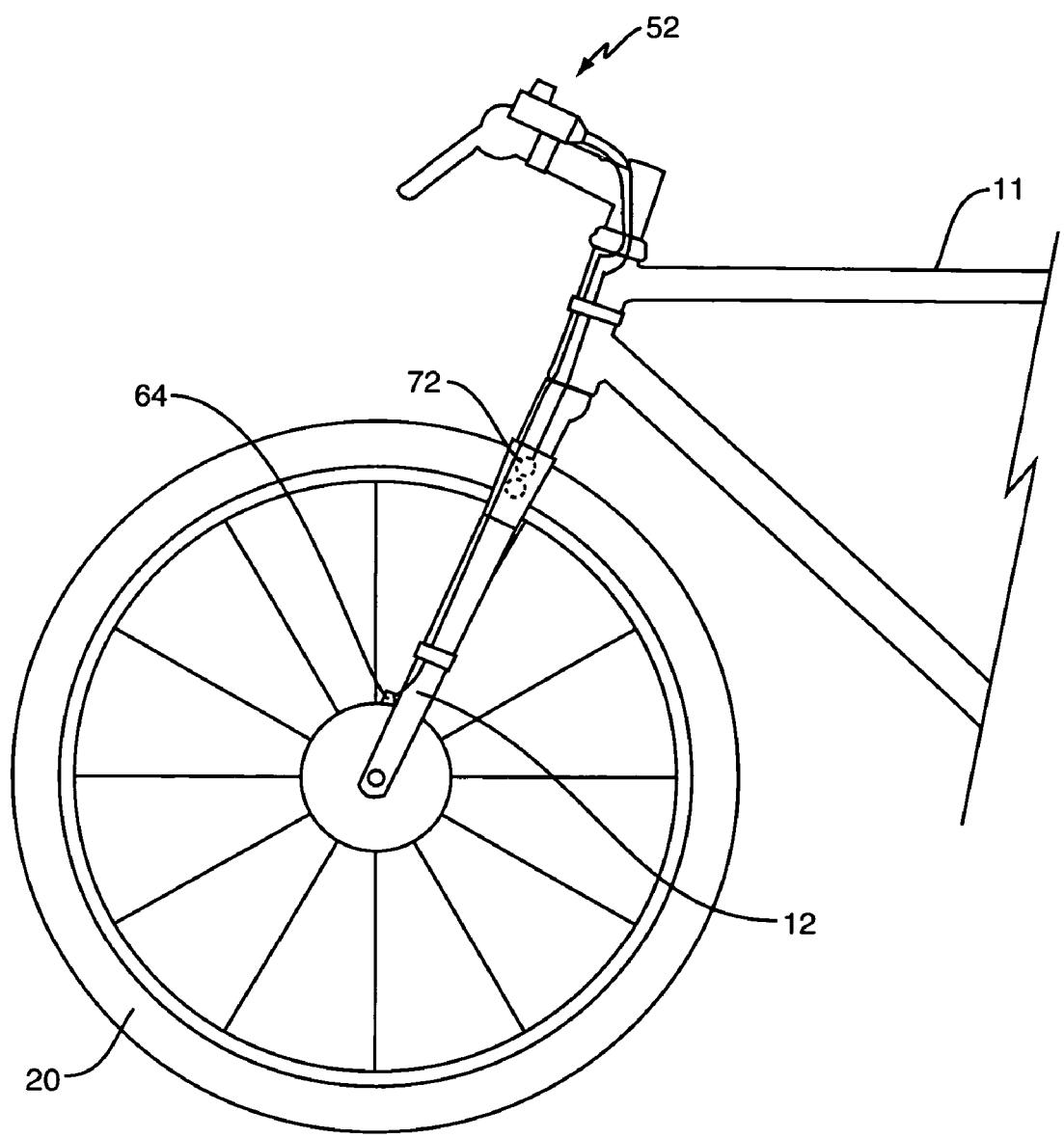
FIG. 11 is a side view of a bicycle fork comprising an ultraviolet wave emitting structure comprising a dynamo generator.

FIG. 11 shows an embodiment where the power source 60 is a dynamo 64 (sometimes referred to as a "generator" in the art) rather than batteries 62, and where the LEDs 72 are contained within a plastic housing 66 attached to forks 12. The dynamo 64 generates power from moving magnetic fields in any fashion known in the art. Only the front portion of the bicycle 10 is shown in FIG. 11, it being understood that an arrangement similar in concept of any of the embodiments may be used for rear portion. There may be, in some embodiments, both front and rear dynamos 64, although such an arrangement may not be cost effective.

Figure 12:
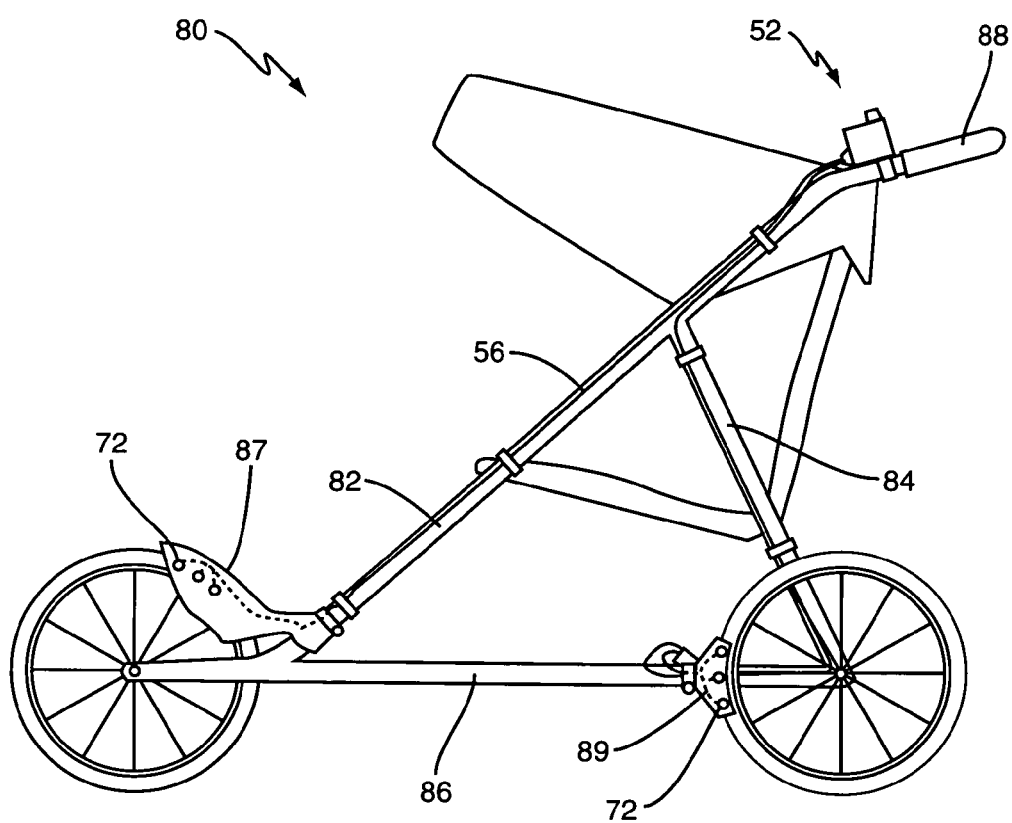
FIG. 12 is a side view of a stroller comprising an ultraviolet wave emitting structure.
Figure 13:
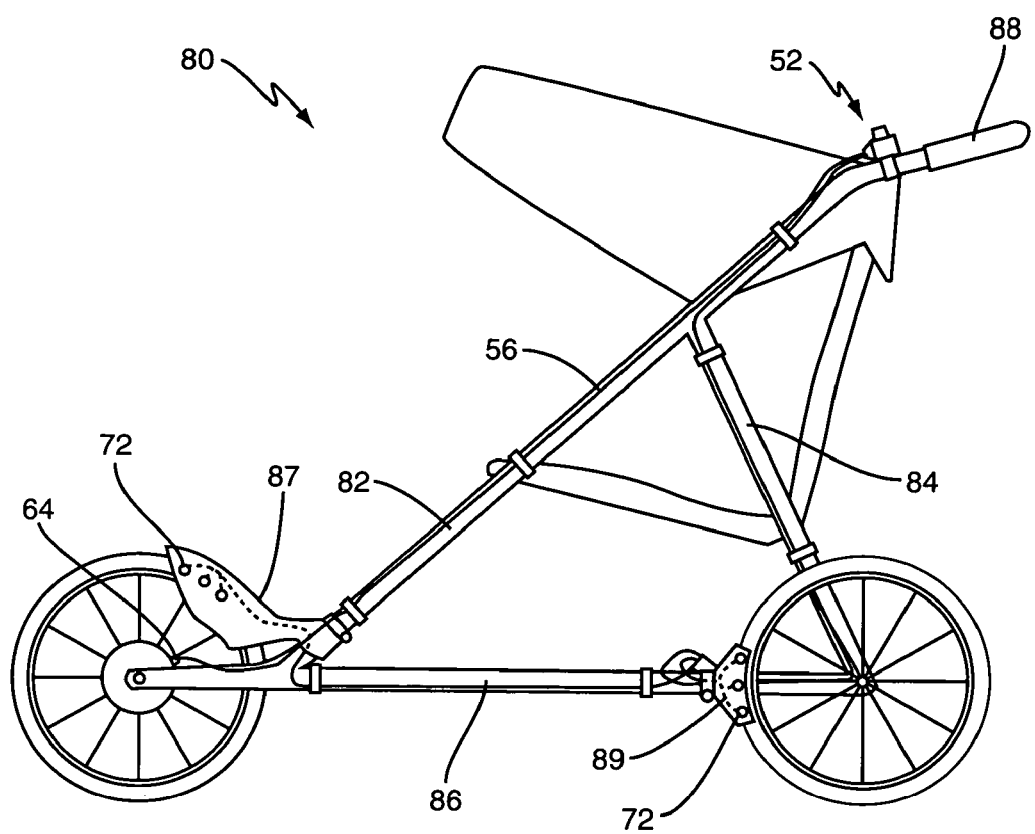
FIG. 13 is a side view of a stroller comprising an ultraviolet wave emitting structure comprising a dynamo type generator.

FIG. 12 shows a phosphorescence charging system 50 used in conjunction with a stroller 80. In general, the stroller includes a front frame tube 82, a rear frame tube 84, and a bottom frame tube 86, that together form a generally triangular shape that supports front wheel 20 and rear wheels 20 (typically in a tricycle configuration). In this embodiment, the phosphorescence charging system 50 includes number of ultraviolet LEDs 72 contained within the stroller's fender 87 and a different set of LEDs 72 contained within a plastic housing 89 connected with bracket to bottom frame tube 86. Switch 54 and battery pack 62 may be mounted to handles 88, and switch 54 selectively connects LEDs 74 to battery pack 62 as generally described above. The embodiment of FIG. 13 uses a similar approach, but with dynamo 64 in place of battery pack 62, and with a correspondingly different wire routing arrangement.

The embodiments discussed above employ various means to direct electromagnetic energy in the form of ultraviolet light onto phosphorescent wheels 20. Such wheels 20 include phosphorescent materials on their side(s) 20a,20b that, following excitement (or "charging") by ultraviolet light, persistently emit visible light in a non-reflective manner, with an intensity that decays over time. The phosphorescent materials may be molded into the side-facing materials of the wheels 20, particularly tire sidewalls 20a,20b, or may be coated onto, or applied via adhesive stickers, thereto. Examples of phosphorescent materials include materials known in the art as "zinc sulphide" and "strontium aluminate," which may phosphoresce in a natural color or may phosphoresce in altered colors using methods known in the art of phosphorescent materials.

The present invention is not limited to charging by emitters that emit solely ultraviolet light, as that term may be used in the strictest scientific sense. Instead, the emitters 70 may emit a broad spectrum of light that may include some ultraviolet light and some near-ultraviolet (but visible) light. As used herein the term ultraviolet means having a wavelength of between about 410 nm and about 10 nm. As used herein the term ultraviolet emitter means an emitter (e.g., LED, fluorescent tube, high intensity discharge lamp, laser, etc.) that emits electromagnetic radiation, with a significant portion of that radiation being ultraviolet. By way of non-limiting example, the ultraviolet emitter(s) may be LEDs with a peak wavelength in the range of 100-410 nanometers, and advantageously in the range 315-405 nanometers.

It should be noted that the various aspects of the embodiments of FIGS. 1-13 may be combined as desired. For example, the embodiment of FIG. 1 may be altered to use a dynamo-based power source 60, rather than a battery pack 62, and to include a photosensor control 55, etc. The other embodiments may likewise be altered to incorporate the various teachings of the various embodiments, alone or in combination. Also, it should be noted the power source 60 for the phosphorescence charging system 50 may be also used to power other lights 100 on the vehicle 10,80. For example, the bicycle 10 may additionally include visible light sources 100 that are directed outwardly, either to the side or to the front/rear of the bicycle 10, with these visible light sources 100 powered by battery pack 62. These visible light sources 100 may be of any suitable kind, such as incandescent bulbs, light emitting diodes, fluorescent bulbs, high intensity discharge lamps, and lasers.

Figure 14:
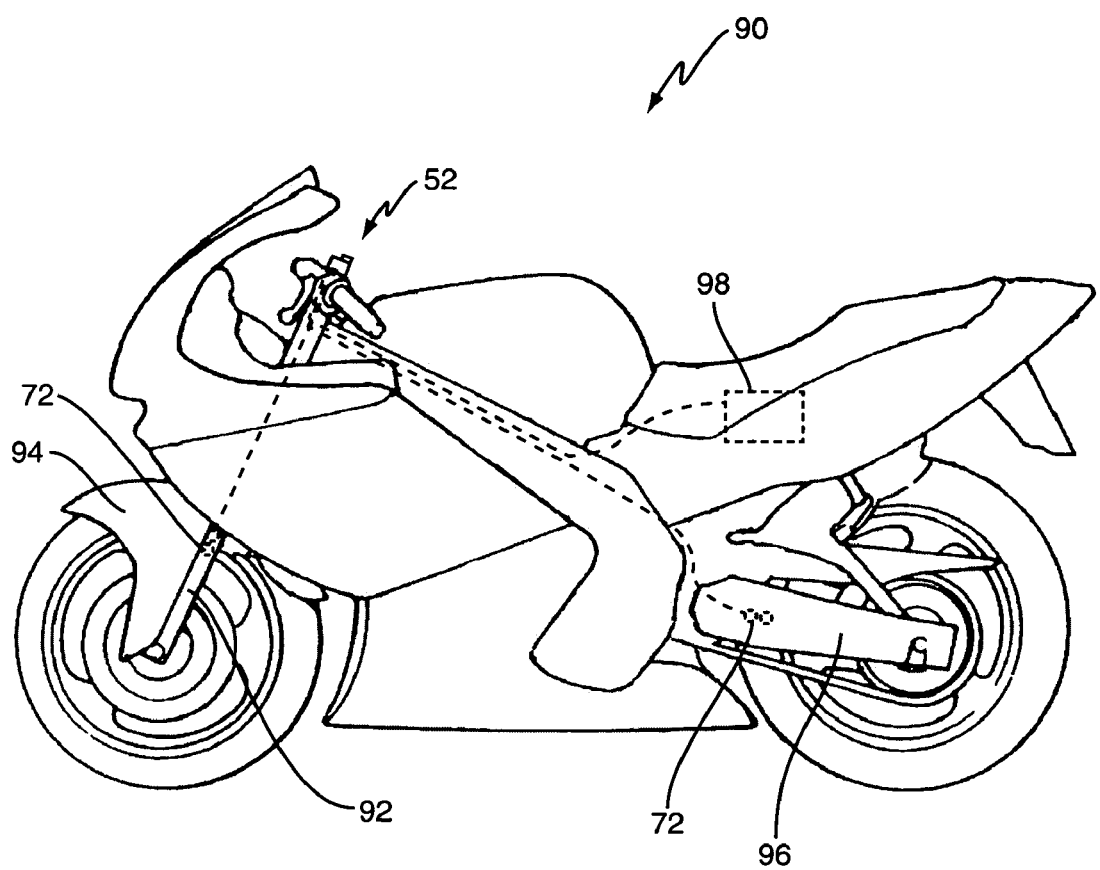
FIG. 14 is a side view of a motorcycle comprising an ultraviolet wave emitting structure.
Figure 15:
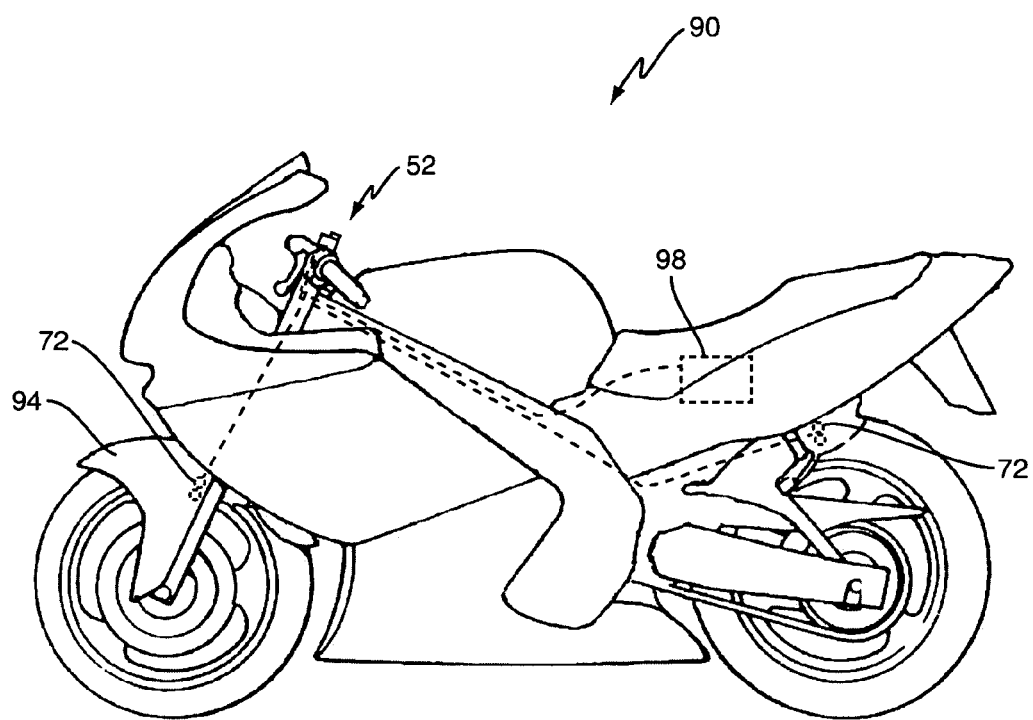
FIG. 15 is a side view of a motorcycle comprising fenders comprising an ultraviolet wave emitting structure.

The illustrative embodiments of FIG. 1-13 have been in the context of a human powered vehicle (e.g., bicycle 10, stroller, etc.); however, in some embodiments, the idea may be extended to an internally powered vehicle, such as a motorcycle. With reference to FIG. 14, a motorcycle may have a plurality of ultraviolet LEDs contained within the surface of its forks. Wire, running up the front of the motorcycle, may connect LEDs to switch associated with handlebars. In addition, a plurality of ultraviolet LEDs may be contained within the surface of the motorcycle's rear swingarm. Wire, running along swing arm and the motorcycle main body, connects LEDs to switch. The switch is, in turn, connected to the motorcycle's battery or other internal power system. The LEDs, shine their ultraviolet light on respective phosphorescent wheels 20. FIG. 15 shows a related embodiment, where the LEDs are located within the inner curvature of the motorcycle's fenders.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A wheeled vehicle, comprising:
   a frame;
   at least one rotatable wheel mounted to said frame; said wheel having first and second phosphorescent sides;
   a phosphorescence charging system coupled to said frame and adapted to charge said first and second phosphorescent sides by radiating said phosphorescent sides with electromagnetic radiation; and
   wherein said phosphorescence charging system comprises an emitter mounted to an element supported by said frame and moveable relative to said wheel;
   wherein said element is selected from the group consisting of a brake pad, and a brake pad post.

2. A wheeled vehicle comprising: a frame; at least one rotatable wheel mounted to said frame; said wheel having first and second phosphorescent sides; a phosphorescence charging system coupled to said frame and adapted to charge said first and second phosphorescent sides by radiating said phosphorescent sides with electromagnetic radiation; and wherein said phosphorescence charging system comprises an emitter mounted to a portion of braking assembly for said wheel wherein said portion is selected from the group consisting of a brake pad, a brake booster, a brake pad post, a brake pad housing, and a brake post.

3. A wheeled vehicle, comprising:
   a frame;
   at least one rotatable wheel mounted to said frame; said wheel having at least a first phosphorescent side;
   a brake assembly operatively coupled to said frame and comprising:
     at least one brake pad moveable relative to wheel and operative to engage said wheel to retard rotation thereof;
     an emitter disposed to direct electromagnetic radiation emitted therefrom at said first phosphorescent side of said wheel so as to charge said first phosphorescent side for subsequent phosphorescence; and
   means to power said emitter; and
   wherein said brake assembly further comprises a brake booster element, and wherein said emitter is disposed in said brake booster element.

4. The wheeled vehicle of claim 3 wherein said brake assembly further comprises a brake pad post disposed outboard of said brake pad relative to said wheel, and wherein said emitter is supported by said brake pad post.

5. A wheeled vehicle, comprising:
   a frame;
   at least one rotatable wheel mounted to said frame; said wheel having at least a first phosphorescent side;
   a brake assembly operatively coupled to said frame and comprising:
     at least one brake pad moveable relative to wheel and operative to engage said wheel to retard rotation thereof;
     an emitter disposed to direct electromagnetic radiation emitted therefrom at said first phosphorescent side of said wheel so as to charge said first phosphorescent side for subsequent phosphorescence; and means to power said emitter; and wherein said emitter is mechanically coupled to said brake pad so as to move with said brake pad relative to said wheel.

6. The wheeled vehicle of claim 5 wherein said emitter is disposed in said brake pad.

* * * * *